July 8, 1958
F. L. HOPKINS
2,842,330
MAGNETIC LOCK FOR SCALE BEAMS AND THE LIKE
Filed Dec. 27, 1956
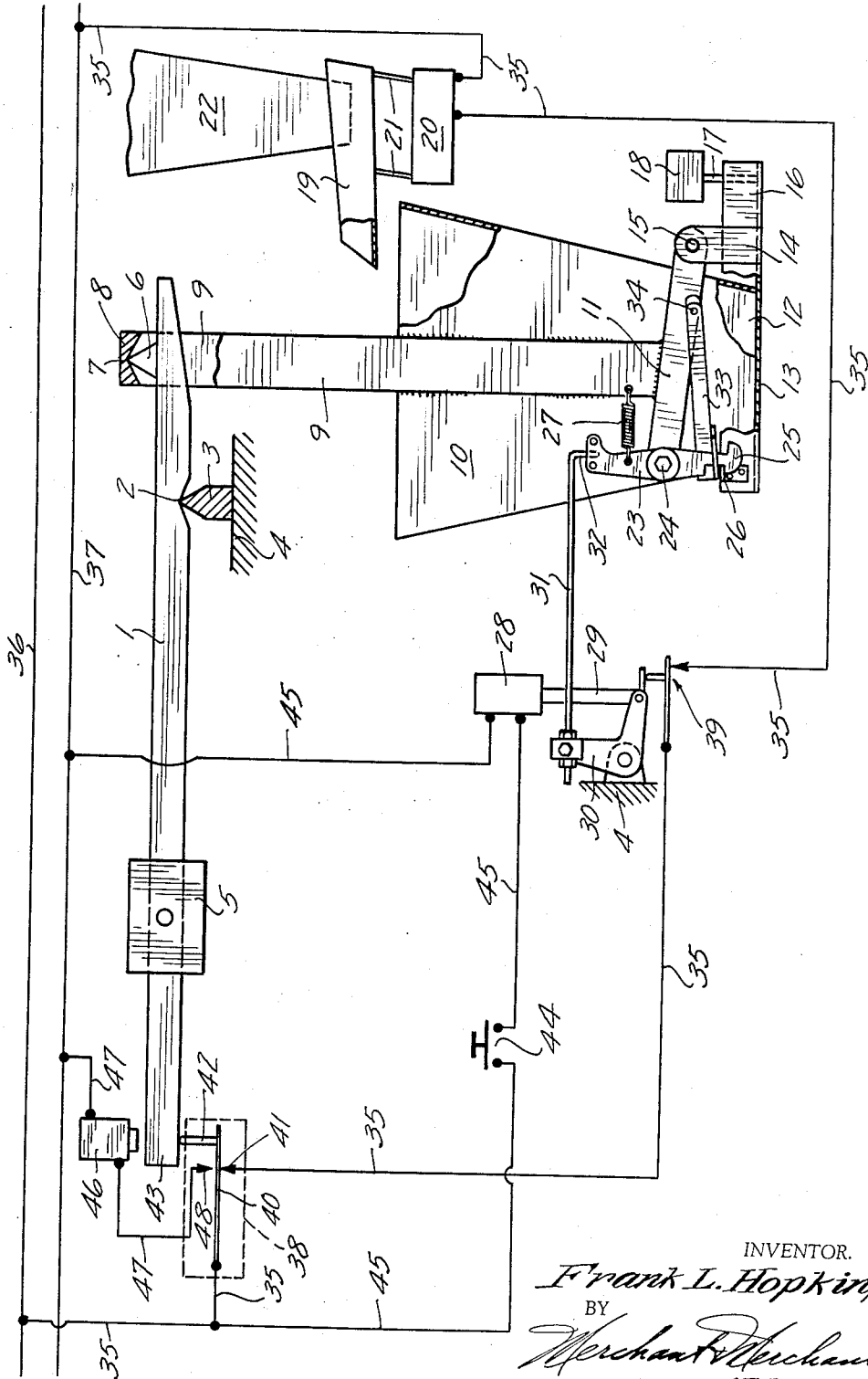
INVENTOR.
*Frank L. Hopkins*
BY
*Merchant & Merchant*
ATTORNEYS

United States Patent Office 2,842,330
Patented July 8, 1958

2,842,330

MAGNETIC LOCK FOR SCALE BEAMS AND THE LIKE

Frank L. Hopkins, Minneapolis, Minn., assignor to Bemis Bro. Bag Co., St. Louis, Mo., a corporation of Missouri Application December 27, 1956, Serial No. 630,790

3 Claims. (Cl. 249—36)

My present invention relates to improvements in devices for automatically weighing and dispensing granular or powdered material, and more specifically to novel means for controlling feed of material to insure accurate and uniform measurement.

Devices of the type set forth usually involve a weighing receptacle or hopper supported by a fulcrum mounted scale beam, mechanism for causing material to be fed from a source of supply to said weighing hopper at a predetermined rate of feed, means for controlling said mechanism, and means for causing the weighing hopper to discharge the weighed quantity of material to a container therefor. Such a device is disclosed in my United States Letters Patent No. 2,772,847, issued December 4, 1956, and entitled "Apparatus for Feeding Bulk Material and Control Therefor." In a device of this type, wherein one or more control switches are operated by movement of the scale beam, the beam tends to oscillate when moved by the combined weight of the scale hopper or bucket and a predetermined quantity of material fed thereto. In the event that a stationary stop element is used to limit swinging movement of the beam toward its hopper-filled position, the portion of the beam which strikes the stop element rebounds therefrom. Such rebounding or oscillation often results in momentary reclosing of the material delivery control switch to cause feeding of material to the scale hopper after the material delivery control switch has been opened by initial movement of the scale beam and prior to discharge of material from the scale hopper. Thus an amount of material is discharged to the container in excess of that intended. Although this excess material amounts to very little with each individual weighing, a considerable loss in profits to the vendor results over an extended period of time. Hence, an important object of my invention is the provision of novel means for holding a scale beam against return movement to its normal hopper-empty position immediately after the material has been delivered to the scale bucket or hopper in the exact desired quantity necessary to overbalance the beam and cause it to swing to its hopper-filled position and thus open the material delivery control switch.

Another object of my invention is the provision of an electromagnet mounted in the path of swinging movement of a scale beam in one direction to hold the beam against return swinging movements as soon as the material delivery control switch has been opened, and of control means operated by said beam to energize said electromagnet when the scale hopper has been filled to the desired weight.

Another object of my invention is the provision of a weighing and dispensing mechanism having an electromagnet and control therefor as set forth, in which said electromagnet exerts insufficient magnetic force to hold the scale beam against return movement to its normal hopper-empty position when the weighing hopper is empty.

The above and still further highly important objects and advantages of my invention will become apparent from the following detailed specification, appended claims and attached drawing.

The single figure of the drawing is a view partly in side elevation and partly in diagram of a weighing device incorporating my invention, some parts being broken away and some parts shown in section.

In the preferred embodiment of the invention illustrated, the numeral 1 indicates a conventional weighing scale beam which is provided intermediate its ends with an inverted V-shaped notch 2 whereby the beam 1 is mounted for swinging movements on a fulcrum element 3. The fulcrum element 3 is rigidly mounted on a supporting frame structure shown but fragmentarily at 4. The scale beam 1 is provided with the usual longitudinally adjustable balance weight 5, and at one end is provided with a knife-edge element 6 that engages an inverted V-shaped notch 7 in a horizontally disposed cross bar 8. At its opposite ends the cross bar 8 is rigidly secured to a pair of laterally spaced depending hanger members 9 that are welded or otherwise rigidly secured at their lower end portions to opposite sides of a weighing bucket or hopper 10. Said bucket or hopper 10 is provided at its opposite sides with cross members 11, one of which is shown, said cross members 11 being welded or otherwise anchored to the hopper 10 at the lower ends of the hanger members 9.

The lower open end 12 of the hopper 10 is normally closed by a gate 13 having a pair of upstanding brackets 14, one of which is shown, that are pivotally connected on aligned axes to the rear ends of the cross members 11, as indicated at 15, for swinging movements between a normal gate-closed position shown, and a gate-open position at substantially right angles thereto. A rearwardly extending portion 16 of the gate 13 is provided with an upwardly extending stem 17 on which is mounted a counterweight 18 which yieldingly urges the gate 13 toward its normal gate-closed position. The yielding bias of the counterbalance 18 is insufficient to overcome the weight of a given quantity of material delivered to the hopper 10.

Means for feeding powdered or granular material to the hopper 10 comprises a feeding tray 19 which is connected to an electromagnetic vibrator 20 by means of a pair of spaced resilient arms 21. The vibrator 20 may be assumed to be suitably mounted on the frame structure 4, the tray 19 underlying the delivery end of a supply chute or hopper indicated fragmentarily at 22. It will be noted that the open front end of the tray 19 overlies the open upper end of the weighing bucket or hopper 10 so that material being fed by the tray 19 will fall into the hopper 10 under the action of gravity.

A generally vertically disposed latch lever 23 is pivotally mounted intermediate its ends to the front end of one of the cross members 11, as indicated at 24, the lower end of the latch lever 23 being formed to provide hook means 25 engageable with a strike element 26 adjacent the front end of the gate 13 to hold the gate 13 in its closed position. A coil tension spring 27 yieldingly urges the latch lever 23 in a direction to cause locking engagement between the hook means 25 and the strike element 26.

Means for moving the latch lever 23 pivotally about the axis of the connection 24 in a counterclockwise direction with respect to the drawing will cause the hook means 25 to be disengaged from the strike 26 to permit opening of the gate 13. Means for thus tripping the latch lever 23 comprises a solenoid 28 which may be assumed to be rigidly carried by the frame structure 4, and a cooperating armature 29 that is suitably coupled to one arm of a bell crank 30 that is pivotally secured with respect to the frame structure 4. A trip arm 31 is pivotally secured to the other arm of the bell crank 30, and its free end comprises a depending portion 32 which operatively engages the end of the latch lever 23 opposite the hook means 25 thereof, whereby energization of the solenoid 28 will cause the latch lever 23 to be moved against bias of spring 27 to permit opening of the gate 13.

A locking bar 33 is pivotally connected at its rear end to the cross member 11, as indicated at 34, and has its front end engaging the lower end portion of the latch lever 23 to hold the latch lever in its gate-released position until the gate 13 closes after discharge of material from the weighing hopper 10. The locking arm 33 together with the structure and mechanism above described is fully disclosed in my prior patent above identified, reference being had thereto. In view of such disclosure, it is believed that further detailed showing and description of the above structure need not be repeated herein.

For the purpose of controlling the vibratory feeding device 19—21 and the latch-operating solenoid 28, I provide mechanism and circuit means now to be described.

The electromagnetic vibrator 20 is interposed in a circuit lead 35 that is connected at its opposite ends to each of a pair of power conductors 36 and 37 which may be assumed to be connected to a generator or like source of electrical potential. Serially interposed in the lead 35 between the vibrator 20 and the power conductor 36 is a scale beam operated switch 38 and a normally closed switch 39, said switch 39 being engaged by the bell crank 30 to be opened thereby upon energization of the solenoid 28. The switch 38 comprises relatively movable and relatively stationary contact elements 40 and 41 respectively, the former having operatively associated therewith an operating button or the like 42 that is engaged by the adjacent end 43 of scale beam 1 when the weighing bucket or hopper 10 is empty to close the connection between the contact elements 40 and 41. The switch 38 may be assumed to be suitably mounted on the frame structure 4 in the conventional manner. The solenoid 28 is interposed in series with a manually operated actuator switch 44 in a lead 45 that is connected to one end to the lead 35 between the power conductor 36 and the beam operated switch 38, and at its other end to the power conductor 37.

With the weighing bucket or hopper 10 in an empty condition, the scale beam is positioned to cause closing of the contact element 40 with its cooperating contact element 41. Power from the conductors 36 and 37 energizes the electromagnetic vibrator 20 through the closed switch 39 to initiate feeding of material from the supply hopper 22 to the weighing hopper 10. When a predetermined amount by weight of material has been fed to the weighing hopper 10, the scale beam 1 becomes overbalanced to cause the free end 43 thereof to be raised out of engagement with the switch operating button 42, thus opening the circuit to the vibrator 20, whereby to terminate feeding of material to the hopper 10. The operator then closes the actuator switch 44 to energize the latch operating solenoid 28. When the solenoid 28 is thus energized, the armature 29 thereof is drawn upwardly to swing the bell crank 30 in a direction to cause the latch lever 23 to release the gate 13 so that the same will open under weight of the material within the hopper 10, causing dumping of the material into a suitable container, not shown, for storage or shipment.

Energization of the solenoid 28 further causes the switch 39 to be opened to maintain the circuit to the vibrator 20 in an open condition until the gate is closed. It will be noted that the locking arm 33 hold the latch element 23, trip arm 31 and bell crank 30 in a latch tripped position to keep the switch 39 opened, until the gate 13 closes. This particular function of the locking arm 33 is fully described in my prior patent, above identified. When all of the material has been dumped from the hopper 10 the gate 13 closes, releasing the latch element 23 and causing the switch 39 to be closed, and the loss of weight of the material from the hopper 10 causes the scale beam to swing in a direction to engage the switch operating button 43 and initiate a subsequent cycle of operation.

In practice, it has been found that, when the weighing hopper 10 is brought up to a predetermined weight to cause swinging of the scale beam 1 about the fulcrum 3, a rocking or oscillatory motion of the beam is produced, causing the free end portion 43 of the scale beam 1 to reclose the connection between the movable switch contact element 40 and the fixed contact element 41 to initiate a momentary feeding cycle of the vibrator 20 after the material delivery control has once opened and before the operator closes the actuator switch 44. In some instances, particularly when a stop means, not shown, is employed to limit swinging movement of the scale beam, the beam rebounds from the stop means and momentarily operates the switch 38 to cause a momentary feeding operation or impulse of the feeding device. Often, two or more such feeding impulses are obtained prior to closing of the actuator switch 44, and the resultant batch or supply of material delivered to the container from the weighing hopper 10 is overweight. As above mentioned, such over-feeding of material causes a substantial loss of material over a given period of operating time.

For the purpose of eliminating the above mentioned oscillatory or rebounding action of the scale beam 1 and resultant over-feeding, I provide means for releasably holding the scale beam 1 out of operative engagement with the switch operating button 42 once the contact elements 40 and 41 of the material delivery control switch 38 have been opened, whereby to effectively prevent operation of the material feeding vibrator 20 until the operator causes the weighed material to be dumped and the machine is in readiness for a subsequent cycle of operation. Such means comprises an electromagnet 46 which may be assumed to be rigidly mounted on the frame structure 4 in upwardly spaced relation to the end portion 43 of the scale beam 1. Preferably, the scale beam 1, or the free end portion 43 thereof, is made from cast iron or like ferrous material to be attracted by the electromagnet 46 when the same is energized. The electromagnet is interposed in a circuit lead 47 that is connected at one end to the power conductor 37, and which at its other end terminates in a fixed contact element 48 of the switch 38, which contact 48 is adapted to be engaged by the movable contact element 40 when the free end portion 43 of the scale beam 1 is moved away from engagement with the switch operating button 42. Preferably, the switch 38 is of a type wherein the movable contact element 40 is yieldingly urged in a direction out of engagement with the contact element 41 and toward engagement with the contact element 48. When sufficient material has been fed to the hopper 10 to cause overbalancing of the scale beam 1 and resultant swinging movement thereof, the free end portion 43 of the scale beam 1 moves into engagement with the electromagnet 46. Closing of the switch contact elements 40 and 48 causes the electromagnet 46 to be energized to grip the free end portion 43 of the scale beam and hold the same against return movement toward the switch 38. Preferably, the electromagnet 46 is so arranged that it will hold the scale beam 1 against return swinging movements when a predetermined amount by weight of material is present in the weighing hopper 10, but the same is not sufficiently strong to hold the free end portion 43 of the scale beam against such return movements after the weighing hopper 10 is emptied. Thus, as soon as emptying takes place, the scale beam 1 will swing toward engagement of the free end portion 43 thereof with the switch operating button 42 to cause opening of the contacts 40 and 48 and initiate a new cycle of operation. During this return movement of the scale beam to its operative position illustrated, the gate 13 swings from its open to its closed position, to release the latch element 23 from engagement with the locking bar 33 and permitting the latch element 23, the tripping arm 31, and the bell crank 30 to move in a direction to reclose the switch 39.

It will be appreciated that my improved device for preventing over-feeding of material to the scale hopper is applicable to various types of weighing and dispensing machines, and that the above described weighing and dispensing mechanism and circuit are but an example of the many thereof that may be used in the accomplishment of the objectives set forth. Hence, I do not wish to be limited to the exact weighing and dispensing structure shown and described, except as defined in the claims.

While I have shown and described a preferred embodiment of my novel means for preventing unwanted feeding of material to the hopper, it will be understood that the same is capable of modification without departure from the spirit and scope of the invention as defined in the claims.

What I claim is:

1. In an automatic weighing device, a weighing hopper, scale means including a beam for supporting said hopper, power-operated mechanism for causing delivery of material to said hopper, said beam being movable between one position assumed thereby when said hopper is empty and another position spaced from said one position when said hopper is filled to a predetermined extent with material delivered thereto, control means for said power-operated mechanism operative to cause delivery of material to said hopper and responsive to movement of the beam to its hopper filled position to deenergize said mechanism, means including an electromagnet engaging said beam in said hopper filled position, and a control switch for said electromagnet responsive to movement of said beam to said hopper filled position to cause said electromagnet to be energized to hold said beam in said hopper filled position.

2. In an automatic weighing device, a weighing hopper, scale means including a beam for supporting said hopper, power-operated mechanism for causing delivery of material to said hopper, said beam being movable between one position assumed thereby when said hopper is empty and another position spaced from said one position when said hopper is filled to a predetermined extent with material delivered thereto, control means for said power-operated mechanism actuated by said beam in its hopper empty position to cause delivery of the material to said hopper and responsive to movement of the beam to its hopper filled position to deenergize said mechanism, means including an electromagnet engaging said beam in its hopper filled position, and a control switch for said electromagnet responsive to movement of said beam to said hopper filled position to cause said electromagnet to be energized to hold said beam in said hopper filled position.

3. In an automatic weighing device, scale means including a beam supported intermediate its ends by a fulcrum and a weighing hopper supported by one end of said beam, power-operated mechanism for causing delivery of material to said hopper, circuit means including a switch for controlling said power-operated mechanism, the free end portion of said beam engaging said switch to close said circuit means when the hopper is empty to energize said power-operated mechanism, said free end portion moving out of engagement with said switch when the hopper is filled to a predetermined extent with said material, a fixed electromagnet mounted in the path of movement of the free end of said beam and engaging said free end upon movement of the beam to its hopper-filled position, and circuit means including a second switch engaged by the free end of said beam upon movement thereof to its hopper-filled position to cause said electromagnet to be energized to hold said beam in its hopper filled position, the magnetic force exerted by said electromagnet being sufficient to hold said beam against return movement to its hopper empty position when said hopper is loaded with a given quantity of said material said force being less than the gravity bias exerted on the free end of the beam when the hopper is empty, whereby to permit return of said beam to its hopper empty position to open the switch for said electromagnet and close the switch controlling said power-operated mechanism.

References Cited in the file of this patent
UNITED STATES PATENTS

| | | |
|---|---|---|
| 2,738,944 | Linstaedt | Mar. 20, 1956 |
| 2,772,847 | Hopkins | Dec. 4, 1956 |